United States Patent
Hardcastle et al.

(10) Patent No.: US 6,576,168 B2
(45) Date of Patent: Jun. 10, 2003

(54) PROCESS FOR MAKING CARBON FOAM INDUCED BY PROCESS DEPRESSURIZATION

(75) Inventors: Leland A. Hardcastle, Decatur, TX (US); Rex G. Sheppard, Decatur, TX (US); David F. Dingus, Decatur, TX (US)

(73) Assignee: Poco Graphite, Inc., Decatur, TX (US)

( * ) Notice: Subject to any disclaimer, the term of this patent is extended or adjusted under 35 U.S.C. 154(b) by 0 days.

(21) Appl. No.: 09/862,560

(22) Filed: May 22, 2001

(65) Prior Publication Data
US 2002/0190414 A1 Dec. 19, 2002

(51) Int. Cl.[7] ............................................. C01B 31/00
(52) U.S. Cl. ....................... 264/29.1; 264/29.6; 264/42; 423/445; 423/448
(58) Field of Search .............................. 264/29.1, 29.6, 264/42, 50; 423/445, 448

(56) References Cited

U.S. PATENT DOCUMENTS

| | | | | |
|---|---|---|---|---|
| 3,857,913 A | * | 12/1974 | Crow et al. .................. | 264/29.1 |
| 4,024,226 A | * | 5/1977 | Lersmacher et al. ......... | 423/449 |
| 4,756,898 A | * | 7/1988 | Hopper et al. ............... | 423/449 |
| 4,832,881 A | * | 5/1989 | Arnold, Jr. et al. .......... | 264/29.7 |
| 4,894,215 A | * | 1/1990 | Kawakubo et al. .......... | 423/449 |
| 5,300,272 A | * | 4/1994 | Simandl et al. .......... | 423/445 R |
| 5,770,127 A | * | 6/1998 | Abrams et al. .............. | 264/29.1 |
| 5,868,974 A | | 2/1999 | Kearns ....................... | 264/29.6 |
| 5,945,084 A | * | 8/1999 | Droege ..................... | 423/447.4 |
| 5,961,814 A | | 10/1999 | Kearns ......................... | 208/39 |
| 6,033,506 A | | 3/2000 | Klett ............................ | 156/78 |
| 6,037,032 A | | 3/2000 | Klett .............................. | 428/71 |

FOREIGN PATENT DOCUMENTS

| WO | WO 01/21550 | 3/2001 | ........... C04B/38/00 |
|---|---|---|---|
| WO | WO 01/21551 | 3/2001 | ........... C04B/38/00 |
| WO | WO 02/18271 | * 3/2002 | |

* cited by examiner

Primary Examiner—Allan R. Kuhns
(74) Attorney, Agent, or Firm—Bracewell & Patterson, L.L.P.

(57) ABSTRACT

A process for producing molded pitch based foam is shown which provides a more uniform density gradient throughout the ultimate product. The process utilizes a pressure drop during processing in order to induce foaming. By inducing foaming through process depressurization, additional viscosity manipulation can be achieved as well as improved density gradient characteristics in the ultimate product.

21 Claims, 1 Drawing Sheet

PROCESS FOR MAKING CARBON FOAM INDUCED BY PROCESS DEPRESSURIZATION

BACKGROUND OF THE INVENTION

1. Field of the Invention

The present invention relates to a process for the manufacture of pitch foams, to the subsequent conversion of pitch foam to carbon and graphite foam and to improvements in the manufacturing process to enhance the properties of the end products.

2. Description of the Prior Art

This invention deals with carbon in its various forms and, particularly to carbon "foams". Carbon foams are a relatively recent area of commercial interest, although carbon fibers have been used commercially in industry for many years. Carbon fibers are known to exhibit extra ordinary mechanical properties due to the unique graphitic morphology of the extruded filaments. Advanced structural composites have been created which advantageously exploit these properties by creating a disconnected network of graphitic filaments held together by an appropriate matrix. Pitch based carbon foams can be considered such an interconnected network of ligaments or struts. As such, pitch based carbon foams represent a potential alternative as a reinforcement in structural composite materials.

Additionally, current applications of carbon fibers have evolved from such structural reinforcement applications to thermal or heat sink applications. For example, heat sinks have been utilized in the aerospace industry to absorb energy in applications such as missiles and aircraft where rapid heat generation is found. A material with a large specific heat capacity is placed in contact with the object that is being heated. During the heating process, heat is transferred to the heat sink from the hot object and, as the heat sink's temperature rises, it "stores" the heat more rapidly than can be dissipated to the environment through normal convections. Carbon foams have been considered for use as such heat sink materials.

These and other applications have stimulated research into novel reinforcements and composite processing methods for carbon foams. High thermal conductivity, low weight and low coefficient of thermal expansion are of primary concern in such designs. For thermal management applications, certain designs which have been considered included sandwich type approaches in which a low density structural core material, such as a honeycomb or foam, is sandwiched between a high thermal conductivity face sheet. Structural cores of these type are generally limited to low density materials to insure that the weight limits are not exceeded. At the present time, carbon foams and carbon honeycomb materials have generally been the only available materials for use in high temperature applications (exceeding 60° C.). High thermal conductivity carbon honeycomb materials have been extremely expensive to manufacture, however, as compared to low conductivity honeycomb materials. Attempts have been made to overcome these shortcomings through the production of pitch based carbon foam materials.

Typical prior art foaming processes utilized a "blowing" technique to produce a foam of the pitch precursor. The pitch is melted and pressurized, and then the pressure is reduced. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," Mat. Res. Soc. Symp., Materials Research Society, 270:29–34 (1992), Hagar, Joseph W. and Max L. Lake, "Formulation of a Mathematical Process Model Process Model for the Foaming of a Mesophase Carbon Precursor," Mat Res. Soc. Symp., Materials Research Society, 270:35–40 (1992), Gibson, L. J. and M. F. Ashby, Cellular Solids: Structures and Properties, Pergamon Press, New York (1988), Gibson, L. J., Mat Sci and Eng A110, 1 (1989), Knippenberg and B. Lersmacher, Phillips Tech. Rev., 36 a (4), (1976), and Bonzom, A., P. Crepaur and E. J. Moutard, U.S. Pat. No. 4,276,246, (1981). Additives can be added to promote, or catalyze, the foaming, such as dissolved gases (like carbon dioxide, or nitrogen), talc powder, freons, or other standard blowing agents used in making polymer foams.

Then, unlike polymer foams, the pitch based foam must generally be oxidatively stabilized by heating in air (or oxygen) for many hours, thereby, cross-linking the structure and "setting" the pitch so it does not melt, and deform the structure, during carbonization. See Hagar, Joseph W. and Max L. Lake, "Formulation for Mathematical Process Model for the Foaming of a Mesophase Carbon Precursor, " Mat. Res. Soc. Symp., Materials Research Society, 270:35–40 (1992) and White, J. L., and P. M. Shaeffer, Carbon, 27:697 (1989). This is a time consuming step and can be an expensive step depending on the part size and equipment required.

Next, the "set" or oxidized pitch foam is then carbonized in an inert atmosphere to temperatures as high as 1100° C. Then, a final heat treatment can be performed at temperatures as high as 3000° C. to fully convert the structure to carbon and produce a carbon foam suitable for structural reinforcement. The previously described prior art processes resulted in foams which exhibited low thermal conductivities, however.

Other techniques may utilize a polymeric precursor, such as a phenolic, urethane, or blends of these with pitch. See Hagar, Joseph W. and Max L. Lake, "Idealized Strut Geometries for Open-Celled Foams, " Mat. Res. Soc. Symp., Materials Research Society, 270:41–46 (1992), Aubert, J. W., (MRS Symposium Proceedings, 207:117–127 (1990), Cowlard F. C. and J. C. Lewis, J. of Mat. Sci., 2:507–512 (1967) and Noda, T., Inagaki and S. Yamada, J. of Non-Crystalline Solids, 1:285–302, (1969). However, these precursors produce a "glassy" or vitreous carbon which does not exhibit graphitic structure and, thus, has a very low thermal conductivity and low stiffness as well. See, Hagar, Joseph W. and Max L. Lake, "Idealized Strut Geometries for Open-Celled Foams, " Mat. Res. Soc. Symp., Materials Research Society, 270:41–46 (1992).

An improvement to the previously prescribed prior art techniques is described in now issued U.S. Pat. No. 6,033, 506, issued Mar. 7, 2000 to Klett and in issued U.S. Pat. No. 6,037,032, issued Mar. 14, 2000, to Klett et al. The process described in these later patents is less time consuming than the techniques previously described, thereby lowering production and fabrication costs. Perhaps more importantly, the Klett process is unique in providing carbon foams with high thermal conductivities, generally greater than 58 W/mK.

Although the Klett process was an improvement in pitch based carbon foaming processes, the Klett process utilized a static pressure during the formation of the green artifact (billet). Routinely, this static pressure selected was about 1000 psig. Graphite artifacts made in this manner have shown a significant density gradient, generally ranging from about 0.25 g/cc at the top of a production billet to about 0.60 g/cc at the bottom of the billet. Such variations can be undesirable, depending upon the particular end application.

A need exists, therefore, for further improvements in pitch based carbon foams and products produced therefrom in which density gradients are reduced.

A need also exists for such a carbon foam exhibiting reduced pore/bubble sizes within the foam during processing.

A need exists for such a process which prevents or reduces thermally induced stresses in the final product.

A need also exists for an improved process for producing a pitch based carbon foam which allows the foam to set faster and which provides an improved ability to manipulate the viscosity of the material during the process stage in which the material is in the liquid/foaming state.

SUMMARY OF THE INVENTION

It is an object of the present invention to provide a pitch based carbon foam having a more uniform density gradient profile, with reduced shrinkage and with less tendency to crack as a finished product.

Density variations in currently produced products are thought to occur between the foaming and solidification steps of the process while the foamed pitch is still in the liquid state. The liquid pitch tends to migrate due to gravity, thereby making the bottom of the production billet denser than the top portion of the billet. The present invention has as one object to slow or stop this migration, thereby improving the density uniformity of the ultimately produced product.

By heating the pitch under an increased pressure, the process temperature can exceed the normal foaming point of the pitch without the pitch actually foaming, i.e., the thermal foaming point is raised. Holding the pitch at such a selected temperature allows the growth of mesophase domains within the pitch, thereby increasing the pitch's viscosity. Higher viscosities at this point in the process reduce the previously described migration problems. The higher pressure of, for example, 8000 psig can then be reduced to, for example, 1000 psig, allowing the heat-treated pitch to foam. Thereafter, a small increase in temperature will solidify the foam. Increasing the viscosity of the pitch also reduces the pore/bubble size of the foam. By manipulating the final process pressure, greater control over pore size is maintained. By changing the hold times and temperatures along with various upper and lower pressure limits, a wider variety of foam products can be produced.

In a specifically preferred process of the invention for producing carbon foam, a pitch precursor is introduced to an appropriate level within a mold. The pitch has a characteristic boiling or foaming point at a given pressure and for a given temperature. Air is purged from the mold and the pitch is pressurized to a preselected initial pressure which will be greater than the ultimate or final pressure utilized. The preselected initial pressure serves to increase the boiling or foaming point of the pitch above the foaming point at the final pressure. The pitch is heated to a temperature below the solidification point but above the liquid and foaming point which typically occurs at the final pressure. The pitch is then depressurized from the initial pressure to the final pressure while maintaining the process temperature above the typical boiling or foaming temperature at the final pressure. The foamed pitch is then heated to a temperature that solidifies the foamed pitch. The solidified foam pitch can then be cooled to room temperature while allowing natural depressurization during cooling to thereby produce a carbon foam.

Additional objects, features and advantages will be apparent in the written description which follows.

DETAILED DESCRIPTION OF THE INVENTION

Figure 1:
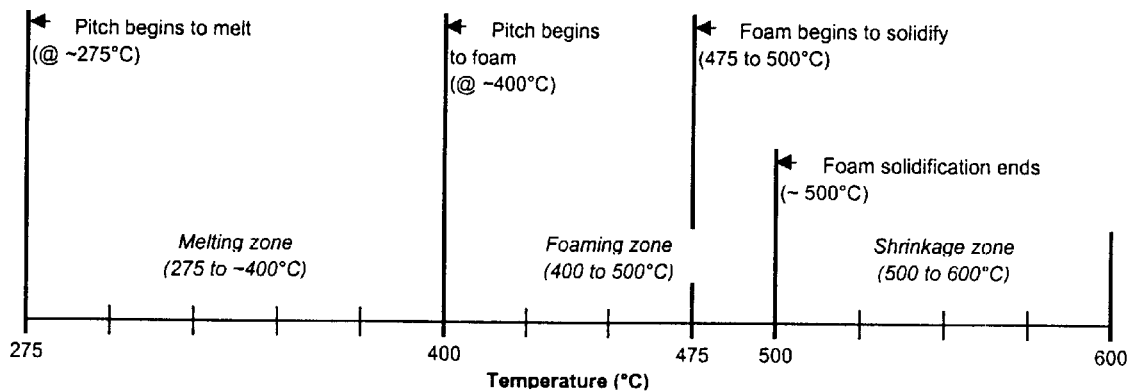
FIG. 1 is a pitch foaming characterization profile of the prior art technique using a static pressure of approximately 1000 psig during formation of the green artifact.

The process of the invention can perhaps best be described with reference to a description of the prior art process as described in now issued U.S. Pat. No. 6,033,506, issued Mar. 7, 2000 to Klett, entitled "Process for Making Carbon Foam", and with reference to FIG. 1 of the drawings. The prior art process used temperature alone to induce foaming whereas the inventive process uses both temperature and a pressure drop during processing to induce foaming. With reference to FIG. 1, the present invention is directed particularly toward that the portion of the process which is illustrated between the point at which the pitch begins to foam and the point at which the foam begins to solidify.

In the process described in the '506 Klett patent, a pitch based foam is produced by placing pitch powder, granules or pellets into a container with the desired final shape of the foam. The pitch can be selected from among the mesophase pitches, isotropic pitches and mixtures thereof. The mesophase pitches include, for example, synthetic pitches, coal based pitches and petroleum based pitches. These pitch materials can be solvated if desired. The pitches can be introduced in the granulated, powdered or pelletized form. One example precursor material is the Mitsubishi ARA-24 mesophase pitch. A proper mold release agent or film can be applied to the sides of the mold to allow removal of the part. Preferably, a suitable liner, such as an aluminum foil liner is utilized. If the mold is made from pure aluminum, typically no mold release agent is necessary since the molten pitch does not wet the aluminum and thus does not stick to the mold.

The pitch is then heated in a substantially oxygen-free environment to avoid oxidation of the pitch materials during heating. Preferably, the pitch is heated in a "HIP" furnace which has been evacuated to less than one torr. Alternatively, the pitch can be heated under a blanket of inert gas, such as nitrogen, to avoid oxidation of the pitch. The pitch is heated to a temperature approximately 50 to 100° C. above the softening point. For example, where Mitsubishi ARA-24 mesophase pitch is used, a temperature of 300° C. is sufficient.

Once the pitch is melted, if it is heated in a vacuum, the vacuum is released to a nitrogen blanket. The pressure inside the furnace is then increased up to about 1000 psi and the temperature of the system is then raised to cause the evolution of pyrolysis gases to form the viscous pitch foam. This viscous pitch foam is fluid and will flow at this point. However, the viscosity of the foam is dependent on the temperature and, in general, as the temperature is increased, the viscosity will decease, making it more flowable. The particular foaming temperature selected is dependent on the precursor pitch to some extent and, in the case illustrated in FIG. 1, the pitch begins to foam at about 400° C.

The temperature of the system is then raised to about 800° C., or to a temperature sufficient to coke the pitch (about 475–500° C.). This is performed at a rate of no greater than about 5° C./min and preferably about 2° C./min. The temperature is held for at least 15 minutes to achieve an assured soak and then the furnace power is turned off and cooled to room temperature. Preferably, the foam was cooled at a rate of approximately 1.5° C./min with release of pressure at a rate of approximately 2 psi/min. During the cooling cycle, pressure is released gradually to atmospheric conditions. The molded, pitch derived foam is then separated from the mold.

The cast pitch derived foam can be post heat treated to temperatures above 2000° C. for conversion to graphitic structure, depending upon the pitch precursor. In general, mesophase pitch is graphitized significantly easier than isotropic pitches (coal derived or petroleum derived). The more graphitic the material, the higher the thermal conductivity of the resulting graphitic foam.

In the specific prior art process illustrated in FIG. 1, the process steps were as follows:

1. An appropriate mold is selected.
2. If needed, a mold release agent or film is applied to the sides of the mold.
3. The mold is filled with a pitch in the form of powder, granules or pellets.
4. The pitch is heated to 300° C. while maintaining a vacuum of less than 1 Torr.
5. Vacuum is released and the pitch is pressurized to 1000 psi with nitrogen gas.
6. The pitch is heated to a coking temperature between 500–800° C. at a rate of 2.0° C. per minute.
7. The foam is held at the predetermined coking temperature for 15 minutes.
8. The foam is cooled to room temperature at a rate of approximately 2.0° C. per minute while simultaneously depressurizing at a rate of approximately 2 psi per minute.

The prior art process thus utilizes a static pressure, which in this case is 1000 psi. That is, the pitch is held at a constant pressure of 1000 psi between the pressurization step indicated as (5) above, and the depressurization step, indicated as (8) above. When billets produced by the above process were analyzed, they were found to contain voids as well as density gradients.

The present invention generally tracks the prior art process with the exception of the pitch foaming to pitch solidification stages. The specific steps followed in the process of the invention are listed below in order to contrast the process steps with the previously described steps of the prior art process:

1. A mold is filled with a pellet or powder form of mesophase pitch.
2. The pitch is then desiccated to assist in removing any residual moisture.
3. The pitch is placed into a Hot Isostatic Press (HIP).
4. The press is purged of air.
5. The pitch is pressurized to a high initial pressure, which increases the boiling or foaming point higher than the foaming point at the final pressure.
6. The pitch is heated to a temperature below the solidification point but above the liquid and foaming point which typically occurs if processed at the final pressure.
7. The pitch is depressurized from the initial pressure to the final pressure while maintaining the process temperature above the typical boiling or foaming temperature at the final pressure.
8. The foam is heated to a temperature that solidifies the foamed pitch.
9. The foam is cooled to room temperature while allowing natural depressurization during cooling.
10. The foam is depressurized of any remaining pressure to atmospheric pressure.
11. The foam is removed from the HIP and mold.

The process of the invention thus heats the pitch under an "increased pressure" which, in effect increases the thermal foaming point. That is, the process temperatures can exceed the "normal" foaming point of the pitch without the pitch actually foaming.

In the prior art example process, the "normal" process pressure selected was 1000 psi, the pressure being essentially held static during the process steps. In the inventive process, the HIP was pressurized to 8000 psi as the "increased pressure." This increased pressure will be understood to be an arbitrary number. In other words, assuming that a doubling of pressure generally increases boiling point by about 10° C., one could roughly estimate the foaming temperature to be affected as follows:

| | |
|---|---|
| 1000 psi | 425° C. |
| 2000 psi | 435° C. |
| 4000 psi | 445° C. |
| 8000 psi | 455° C. |

Thus, 8000 psi was selected as the "increased" pressure to achieve the desired pressurization induced foaming effect.

Figure 2:
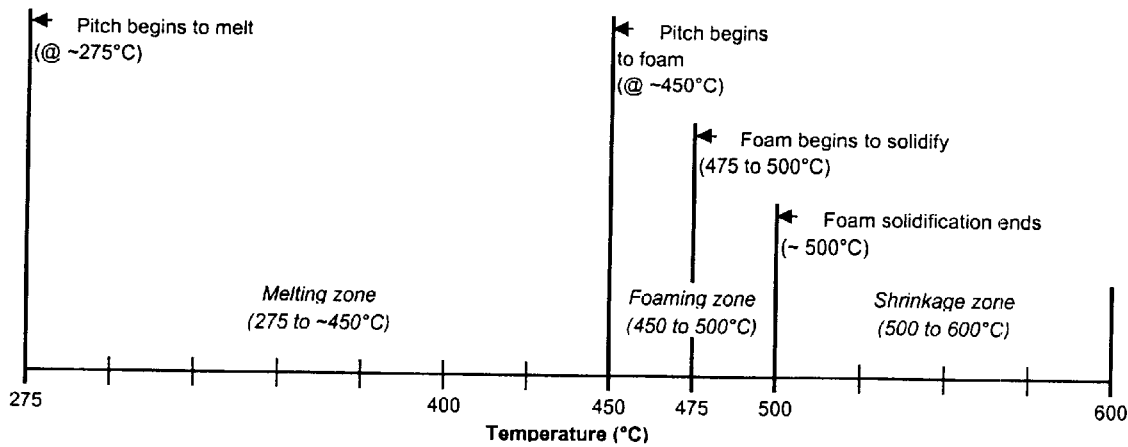
FIG. 2 is a similar pitch foaming characterization profile demonstrating the process of the invention.

With reference to FIG. 2 of the drawings, the following examples are intended to be illustrative of the process steps of the invention without being limiting:

EXAMPLE I

1. The mold is filled with a predetermined amount of pitch to give an appropriate foam height.
2. The mold is placed in the HIP.
3. The HIP vessel is evacuated to <2 Torr with the vacuum being held for 15 minutes.
4. The vessel is pressurized to 8000 psi with nitrogen gas.
5. The pitch is heated from room temperature to 300° C. at a rate of 3.5° C. per minute.
6. The pitch is held at 300° C. for 1 hour.
7. The pitch is heated from 300 to 450° C. at a rate of 2.0° per minute.
8. The pitch is held at 450° C. for 1 hour. (This increases the viscosity of the liquid pitch).
9. The vessel is depressurized from 8000 to 1000 psi at a rate of 700 psi per minute while maintaining a temperature of 450° C. (At this stage, the liquid pitch begins to foam.)
10. The foam is heated from 450 to 475° C. at a rate of 2.0° C. per minute.
11. The foam is held at 475° C. for 1 hour. (This is the point at which the foam begins to set).
12. The foam is heated from 475 to 500° C. at a rate of 0.5° C. per minute.
13. The foam is held at 500° C. for 30 minutes. (At this point, the foam fully solidifies).
14. The foam is heated from 500 to 600° C. at a rate of 1.0° per minute.

15. The foam is held at 600° C. for 2 hours.
16. The foam is cooled from 600° C. to RT at a rate of 2.0° C. per minute.
17. The vessel naturally depressurized during cooldown from 600° C. to room temperature.
18. The remaining vessel pressure is released at a rate approximately 30 psi per minute.
19. The foam is removed from the HIP and its mold.
20. The foam is then heat treated to approximately 1000° C. for carbonization.
21. The foam is then heat treated to aproximately 2800° C. for graphitization.

Results: Thermal Conductivity ranged from 90–132 W/mK.
Apparent Density ranged from 0.44–0.46 g/cm$^3$.

EXAMPLE II

Same as Example I except:
8. The pitch is held at 450° C. for 2 hours.

Results: Thermal Conductivity ranged from 200–244 W/mK.
Apparent Density ranged from 0.56–0.62 g/cm$^3$.

EXAMPLE III

Same as Example I except:
9. The vessel is depressurized from 8000 to 1000 psi at a rate of 117 psi per minute while maintaining a temperature of 450° C.

Results: Thermal Conductivity ranged from 146–184 W/mK.
Apparent Density ranged from 0.43–0.45 g/cm$^3$.

An invention has been provided with several advantages. The process of the invention results in graphite foams having more uniform density gradient properties. The increased viscosity of the pitch during the processing operation reduces pore/bubble sizes within the foam. Manipulation of the final process temperature allows greater control over pore size. Additionally, changing the hold times and temperature along with the various upper and lower pressure limits allows the production of a wider variety of foam products. The pitch based foams of the invention exhibit thermal conductivities ranging from about 90–244 W/mK. The process provides a foam which can be set quicker since the temperature difference between the foaming point and solidification is reduced. Because the pitch is still liquid up to approximately 465° C., a more effective means of manipulating the viscosity and mesophase growth, during processing, now exists.

While the invention has been shown in only one of its forms, it is not thus limited, but is susceptible to various changes and modifications without departing the sprit thereof.

What is claimed is:

1. A method of producing carbon foam, comprising the steps of:
   introducing a solid pitch to an appropriate level in a mold which is placed within a reaction vessel, the initially solid pitch, once melted to a liquid, having a characteristic boiling or foaming point at a given pressure and for a given temperature;
   purging air from the reaction vessel;
   pressurizing the reaction vessel between a preselected high initial pressure and a final process pressure, the preselected high initial pressure serving to increase the temperature at which the pitch would normally boil in the reaction vessel after being liquified by heating;
   wherein the pitch has a given solidification point with continued heating after being heated to liquid and wherein the pitch is heated to liquid within the reaction vessel to a selected temperature which is below the solidification point and above the boiling point of the pitch at the final process pressure but below the boiling point of the pitch at the preselected high initial pressure;
   holding the liquid pitch at the selected temperature for a predetermined period of time to increase the viscosity of the liquid pitch;
   depressurizing the pitch from the high initial pressure to the final process pressure while maintaining the process temperature above the typical boiling or foaming temperature at the final pressure, whereby boiling and foaming of the pitch begins;
   heating the foamed pitch to a temperature that solidifies the foamed pitch;
   cooling the solidified foamed pitch to room temperature while allowing natural depressurization during cooling to thereby produce a carbon foam.

2. The method of claim 1, wherein the pitch is introduced in a form selected from the group consisting of granulated pitches, powdered pitches and pelletized pitches.

3. The method of claim 1, wherein the pitch is selected from the group consisting of mesophase and isotropic pitches and mixtures thereof.

4. The method of claim 3, wherein the pitch is a mesophase pitch selected from the group consisting of synthetic pitches, coal based pitches, petroleum based pitches and mixtures thereof.

5. The method of claim 1, wherein the mold is lined with a metal liner.

6. The method of claim 1, wherein the HIP is pressurized to an initial pressure between about 4000 and 16,000 psig with an inert gas.

7. The method of claim 6, wherein the inert gas is selected from the group consisting of nitrogen gas and argon gas.

8. The method of claim 1, wherein the pitch is heated from room temperature to a melting temperature in the range from about 250 to 350° C. at a rate between about 1.0 and 10.0° C. per minute.

9. The method of claim 1, wherein the pitch is held at a temperature between about 250 and 350° C. for up to about 10 hours.

10. The method of claim 1, wherein the pitch is heated between about 250 and 450° C. at a rate between about 1.0 and 10.0° C. per minute.

11. The method of claim 1, wherein the pitch is held between 250 and 450° C. from 0 to 4 hours.

12. The method of claim 1, wherein the HIP is depressurized from the initial pressure to the final pressure at a rate between 50 and 700 psig per minute while maintaining the pre-depressurization temperature.

13. The method of claim 12, wherein the final pressure is between 50 and 4000 psig.

14. The method of claim 12, wherein, after depressurization, the foam is heated from its pre-depressurization temperature to a temperature between 400 and 800° C. at a rate between 1.0 and 10.0° C. per minute.

15. The method of claim 14, wherein the foam is held between 400 and 800° C. from 0 to 4 hours.

16. The method of claim 15, wherein the foam is cooled from between 400 and 800° C. to room temperature at a rate between 1.0 and 30° C. per minute.

17. The method of claim 1, further comprising the steps of:

heating the carbon foam in a non-oxidizing atmosphere to a temperature sufficient to carbonize the carbon foam to form a carbonized carbon foam; and heating the carbonized carbon foam in a non-oxidizing atmosphere to a temperature sufficient to form a thermally conductive essentially graphitic carbon foam.

18. The method of claim 1, wherein the carbon foam is characterized as having a thermal conductivity ranging from about 90 to 244 W/mK.

19. The method of claim 1, wherein the carbon foam is characterized as having an apparent density ranging from about 0.43 to 0.62.

20. The method of claim 1, wherein the carbon foam is characterized by the substantial absence of internal voids.

21. A method of producing carbon foam, comprising the steps of:

selecting an appropriate mold shape;

introducing an initially solid pitch to an appropriate level in the mold, the initially solid pitch, once melted to a liquid, having a characteristic boiling or foaming point at a given pressure and for a given temperature;

desiccating the pitch to assist in removing any residual moisture;

placing the mold within a hot isostatic press and purging air from the press and from the mold;

pressurizing the hot isostatic press between a preselected high initial pressure and a final process pressure, the preselected high initial pressure serving to increase the temperature at which the pitch would normally boil in the hot isostatic press after being liquified by heating;

wherein the pitch has a given solidification point with continued heating after being heated to liquid and wherein the pitch is heated to liquid within the hot isostatic press to a selected temperature which is below the solidification point and above the boiling point of the pitch at the final process pressure but below the boiling point of the pitch at the preselected high initial pressure;

holding the liquid pitch at the selected temperature for a predetermined time to increase the viscosity of the liquid pitch;

depressurizing the pitch from the high initial pressure to the final process pressure while maintaining the process temperature above the typical boiling or foaming temperature at the final pressure, whereby boiling and foaming of the pitch begins;

heating the foamed pitch to a temperature that solidifies the foamed pitch;

cooling the solidified foamed pitch to room temperature while allowing natural depressurization during cooling to thereby produce a carbon foam;

depressurizing the carbon foam to atmospheric pressure; and removing the carbon foam from the hot isostatic press and from the mold.

* * * * *